US010735209B2

(12) United States Patent
Kaki et al.

(10) Patent No.: US 10,735,209 B2
(45) Date of Patent: Aug. 4, 2020

(54) BITRATE UTILIZATION FEEDBACK AND CONTROL IN 5G-NSA NETWORKS

(71) Applicant: Cisco Technology, Inc., San Jose, CA (US)

(72) Inventors: Somaraju Kaki, Bangalore (IN); Sandeep Dasgupta, Bangalore (IN)

(73) Assignee: CISCO TECHNOLOGY, INC., San Jose, CA (US)

(*) Notice: Subject to any disclaimer, the term of this patent is extended or adjusted under 35 U.S.C. 154(b) by 98 days.

(21) Appl. No.: 16/058,703

(22) Filed: Aug. 8, 2018

(65) Prior Publication Data
US 2020/0052916 A1 Feb. 13, 2020

(51) Int. Cl.
H04W 4/24 (2018.01)
H04L 12/14 (2006.01)
H04L 12/24 (2006.01)
H04M 15/00 (2006.01)
H04L 29/06 (2006.01)

(52) U.S. Cl.
CPC ...... H04L 12/1407 (2013.01); H04L 41/0893 (2013.01); H04L 65/102 (2013.01); H04M 15/66 (2013.01); H04W 4/24 (2013.01)

(58) Field of Classification Search
CPC ............... H04L 12/1407; H04L 65/102; H04L 41/0893; H04L 12/14; H04W 4/24; H04M 15/66; H04M 15/00
See application file for complete search history.

(56) References Cited

U.S. PATENT DOCUMENTS

| 4,236,068 A | 11/1980 | Walton |
| 5,642,303 A | 6/1997 | Small et al. |
| 5,751,223 A | 5/1998 | Turner |
| 6,812,824 B1 | 11/2004 | Goldinger et al. |

(Continued)

FOREIGN PATENT DOCUMENTS

| WO | WO 2013/020126 | 2/2013 |
| WO | WO 2014/098556 | 6/2014 |
| WO | 2018009340 A1 | 1/2018 |

OTHER PUBLICATIONS

Geller et al., "5G Security Innovation with Cisco," Whitepaper Cisco Public, Jun. 8, 2018, pp. 1-29.

(Continued)

Primary Examiner — Julio R Perez
(74) Attorney, Agent, or Firm — Polsinelli PC

(57) ABSTRACT

Disclosed are technologies for optimally utilizing 5G-NSA network resources via an Aggregate Maximum Bitrate (AMBR) feedback mechanism. A User Equipment (UE) is registered with a 5G-NSA network environment and a 5G AMBR is negotiated. A bearer-specific timer is triggered in response to detecting one or more data flows to the UE. Next, a Secondary Radio Access Technology (RAT) Data Usage Report is monitored for. In response to the bearer-specific timer expiring without a Secondary RAT Data Usage Report being received, it is determined that the UE is not currently being served by a 5G RAT. Subsequently, local rate limiting is performed to reduce the negotiated 5G AMBR to a limited AMBR having a lower bitrate than the negotiated 5G AMBR. The UE connection to the 5G-NSA network environment is then configured with the limited AMBR.

20 Claims, 6 Drawing Sheets

(56) References Cited

U.S. PATENT DOCUMENTS

| | | | |
|---|---|---|---|
| D552,603 S | 10/2007 | Tierney | |
| 7,573,862 B2 | 8/2009 | Chambers et al. | |
| D637,569 S | 5/2011 | Desai et al. | |
| 7,975,262 B2 | 7/2011 | Cozmei | |
| 8,010,079 B2 | 8/2011 | Mia et al. | |
| 8,102,814 B2 | 1/2012 | Rahman et al. | |
| 8,260,320 B2 | 9/2012 | Herz | |
| 8,284,748 B2 | 10/2012 | Borghei | |
| 8,300,594 B1 | 10/2012 | Bernier et al. | |
| 8,325,626 B2 | 12/2012 | Tóth et al. | |
| 8,396,485 B2 | 3/2013 | Grainger et al. | |
| 8,446,899 B2 | 5/2013 | Lei et al. | |
| 8,458,184 B2 | 6/2013 | Dorogusker et al. | |
| D691,636 S | 10/2013 | Bunton | |
| 8,549,638 B2 | 10/2013 | Aziz | |
| 8,644,301 B2 | 2/2014 | Tamhankar et al. | |
| 8,650,279 B2 | 2/2014 | Mehta et al. | |
| 8,669,902 B2 | 3/2014 | Pandey et al. | |
| 8,676,182 B2 | 3/2014 | Bell et al. | |
| 8,682,279 B2 | 3/2014 | Rudolf et al. | |
| 8,693,367 B2 | 4/2014 | Chowdhury et al. | |
| 8,718,644 B2 | 5/2014 | Thomas et al. | |
| 8,768,389 B2 | 7/2014 | Nenner et al. | |
| 8,849,283 B2 | 9/2014 | Rudolf et al. | |
| 8,909,698 B2 | 12/2014 | Parmar et al. | |
| 8,958,318 B1 | 2/2015 | Hastwell et al. | |
| 9,060,352 B2 | 6/2015 | Chan et al. | |
| 9,130,859 B1 | 9/2015 | Knappe | |
| 9,173,084 B1 | 10/2015 | Foskett | |
| 9,173,158 B2 | 10/2015 | Varma | |
| D744,464 S | 12/2015 | Snyder et al. | |
| D757,424 S | 5/2016 | Phillips et al. | |
| D759,639 S | 6/2016 | Moon et al. | |
| 9,389,992 B2 | 7/2016 | Gataullin et al. | |
| 9,426,305 B2 | 8/2016 | De Foy et al. | |
| D767,548 S | 9/2016 | Snyder et al. | |
| D776,634 S | 1/2017 | Lee et al. | |
| 9,544,337 B2 | 1/2017 | Eswara et al. | |
| 9,609,504 B2 | 3/2017 | Karlqvist et al. | |
| 9,642,167 B1 | 5/2017 | Snyder et al. | |
| 9,654,344 B2 | 5/2017 | Chan et al. | |
| 9,713,114 B2 | 7/2017 | Yu | |
| 9,772,927 B2 | 9/2017 | Gounares et al. | |
| 9,820,105 B2 | 11/2017 | Snyder et al. | |
| D804,450 S | 12/2017 | Speil et al. | |
| 9,858,559 B2 | 1/2018 | Raleigh et al. | |
| 9,860,151 B2 | 1/2018 | Ganichev et al. | |
| 9,933,224 B2 | 2/2018 | Dumitriu et al. | |
| 9,923,771 B2 * | 3/2018 | Shah | H04L 65/60 |
| 9,923,780 B2 | 3/2018 | Rao et al. | |
| 9,967,906 B2 | 5/2018 | Verkaik et al. | |
| 9,980,220 B2 | 5/2018 | Snyder et al. | |
| 9,985,837 B2 | 5/2018 | Rao et al. | |
| 10,292,066 B2 * | 5/2019 | Sastry | H04W 28/02 |
| 2003/0087645 A1 | 5/2003 | Kim et al. | |
| 2003/0116634 A1 | 6/2003 | Tanaka | |
| 2004/0203572 A1 | 10/2004 | Aerrabotu et al. | |
| 2005/0090225 A1 | 4/2005 | Muehleisen et al. | |
| 2005/0169193 A1 | 8/2005 | Black et al. | |
| 2005/0186904 A1 | 8/2005 | Kowalski et al. | |
| 2006/0022815 A1 | 2/2006 | Fischer et al. | |
| 2006/0030290 A1 | 2/2006 | Rudolf et al. | |
| 2006/0092964 A1 | 5/2006 | Park et al. | |
| 2006/0126882 A1 | 6/2006 | Deng et al. | |
| 2006/0187866 A1 | 8/2006 | Werb et al. | |
| 2007/0037605 A1 | 2/2007 | Logan | |
| 2007/0239854 A1 | 10/2007 | Janakiraman et al. | |
| 2008/0037715 A1 | 2/2008 | Prozeniuk et al. | |
| 2008/0084888 A1 | 4/2008 | Yadav et al. | |
| 2008/0101381 A1 | 5/2008 | Sun et al. | |
| 2008/0163207 A1 | 7/2008 | Reumann et al. | |
| 2008/0233969 A1 | 9/2008 | Mergen | |
| 2009/0129389 A1 | 5/2009 | Halna DeFretay et al. | |
| 2009/0203370 A1 | 8/2009 | Giles et al. | |
| 2009/0282048 A1 | 11/2009 | Ransom et al. | |
| 2009/0298511 A1 | 12/2009 | Paulson | |
| 2009/0307485 A1 | 12/2009 | Weniger et al. | |
| 2010/0039280 A1 | 2/2010 | Holm et al. | |
| 2010/0097969 A1 | 4/2010 | De Kimpe et al. | |
| 2011/0087799 A1 | 4/2011 | Padhye et al. | |
| 2011/0142053 A1 | 6/2011 | Van Der Merwe et al. | |
| 2011/0182295 A1 | 7/2011 | Singh et al. | |
| 2011/0194553 A1 | 8/2011 | Sahin et al. | |
| 2011/0228779 A1 | 9/2011 | Goergen | |
| 2012/0023552 A1 | 1/2012 | Brown et al. | |
| 2012/0054367 A1 | 3/2012 | Ramakrishnan et al. | |
| 2012/0088476 A1 | 4/2012 | Greenfield | |
| 2012/0115512 A1 | 5/2012 | Grainger et al. | |
| 2012/0157126 A1 | 6/2012 | Rekimoto | |
| 2012/0167207 A1 | 6/2012 | Beckley et al. | |
| 2012/0182147 A1 | 7/2012 | Forster | |
| 2012/0311127 A1 | 12/2012 | Kandula et al. | |
| 2012/0324035 A1 | 12/2012 | Cantu et al. | |
| 2013/0029685 A1 | 1/2013 | Moshfeghi | |
| 2013/0039391 A1 | 2/2013 | Skarp | |
| 2013/0057435 A1 | 3/2013 | Kim | |
| 2013/0077612 A1 | 3/2013 | Khorami | |
| 2013/0088983 A1 | 4/2013 | Pragada et al. | |
| 2013/0107853 A1 | 5/2013 | Pettus et al. | |
| 2013/0108263 A1 | 5/2013 | Srinivas et al. | |
| 2013/0115916 A1 | 5/2013 | Herz | |
| 2013/0145008 A1 | 6/2013 | Kannan et al. | |
| 2013/0155906 A1 | 6/2013 | Nachum et al. | |
| 2013/0191567 A1 | 7/2013 | Rofougaran et al. | |
| 2013/0203445 A1 | 8/2013 | Grainger et al. | |
| 2013/0217332 A1 | 8/2013 | Altman et al. | |
| 2013/0232433 A1 | 9/2013 | Krajec et al. | |
| 2013/0273938 A1 | 10/2013 | Ng et al. | |
| 2013/0317944 A1 | 11/2013 | Huang et al. | |
| 2013/0322438 A1 | 12/2013 | Gospodarek et al. | |
| 2013/0343198 A1 | 12/2013 | Chhabra et al. | |
| 2013/0347103 A1 | 12/2013 | Veteikis et al. | |
| 2014/0007089 A1 | 1/2014 | Bosch et al. | |
| 2014/0016926 A1 | 1/2014 | Soto et al. | |
| 2014/0025770 A1 | 1/2014 | Warfield et al. | |
| 2014/0052508 A1 | 2/2014 | Pandey et al. | |
| 2014/0059655 A1 | 2/2014 | Beckley et al. | |
| 2014/0087693 A1 | 3/2014 | Walby et al. | |
| 2014/0105213 A1 | 4/2014 | A K et al. | |
| 2014/0118113 A1 | 5/2014 | Kaushik et al. | |
| 2014/0148196 A1 | 5/2014 | Bassan-Eskenazi et al. | |
| 2014/0179352 A1 | 6/2014 | V.M. et al. | |
| 2014/0191868 A1 | 7/2014 | Ortiz et al. | |
| 2014/0198808 A1 | 7/2014 | Zhou | |
| 2014/0233460 A1 | 8/2014 | Pettus et al. | |
| 2014/0269321 A1 | 9/2014 | Kamble et al. | |
| 2014/0302869 A1 | 10/2014 | Rosenbaum et al. | |
| 2014/0337824 A1 | 11/2014 | St. John et al. | |
| 2014/0341568 A1 | 11/2014 | Zhang et al. | |
| 2015/0016286 A1 | 1/2015 | Ganichev et al. | |
| 2015/0016469 A1 | 1/2015 | Ganichev et al. | |
| 2015/0030024 A1 | 1/2015 | Venkataswami et al. | |
| 2015/0043581 A1 | 2/2015 | Devireddy et al. | |
| 2015/0063166 A1 | 3/2015 | Sif et al. | |
| 2015/0065161 A1 | 3/2015 | Ganesh et al. | |
| 2015/0087330 A1 | 3/2015 | Prechner et al. | |
| 2015/0103818 A1 | 4/2015 | Kuhn et al. | |
| 2015/0163192 A1 | 6/2015 | Jain et al. | |
| 2015/0172391 A1 | 6/2015 | Kasslin et al. | |
| 2015/0223337 A1 | 8/2015 | Steinmacher-Burow | |
| 2015/0256972 A1 | 9/2015 | Markhovsky et al. | |
| 2015/0264519 A1 | 9/2015 | Mirzaei et al. | |
| 2015/0280827 A1 | 10/2015 | Adiletta et al. | |
| 2015/0288410 A1 | 10/2015 | Adiletta et al. | |
| 2015/0326704 A1 | 11/2015 | Ko et al. | |
| 2015/0358777 A1 | 12/2015 | Gupta | |
| 2015/0362581 A1 | 12/2015 | Friedman et al. | |
| 2016/0007315 A1 | 1/2016 | Lundgreen et al. | |
| 2016/0044627 A1 | 2/2016 | Aggarwal et al. | |
| 2016/0099847 A1 | 4/2016 | Melander et al. | |
| 2016/0105408 A1 | 4/2016 | Cooper et al. | |
| 2016/0127875 A1 | 5/2016 | Zampini, II | |
| 2016/0146495 A1 | 5/2016 | Malve et al. | |
| 2016/0344641 A1 | 11/2016 | Javidi et al. | |

(56) References Cited

U.S. PATENT DOCUMENTS

| | | |
|---|---|---|
| 2017/0026974 A1 | 1/2017 | Dey et al. |
| 2017/0214551 A1 | 7/2017 | Chan et al. |
| 2018/0069311 A1 | 3/2018 | Pallas et al. |
| 2018/0084389 A1 | 3/2018 | Snyder et al. |
| 2019/0037618 A1* | 1/2019 | Yang .................. H04L 12/4633 |
| 2019/0253917 A1* | 8/2019 | Dao .................. H04W 28/0268 |

OTHER PUBLICATIONS

Antonioli et al., "Dual Connectivity for LTE-NR Cellular Networks," Research Gate, Sep. 3-6, 2017, pp. 171-175.

"I Love WiFi, The difference between L2 and L3 Roaming Events," Apr. 1, 2010, 6 pages.

Afolabi, Ibrahim, et al., "Network Slicing & Softwarization: A Survey on Principles, Enabling Technologies & Solutions," Mar. 21, 2018, pp. 1-24.

Carter, Steve Sr., "E911 VoIP Essentials for Enterprise Deployments," XO Communications, LLC, 2012, 9 pages.

Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.

Cisco ASR 5x00 Mobility Management Entity Administration Guide, Version 15.0, Last updated Jun. 13, 2014, Cisco, 1-266.

Cisco Systems, Inc., "Wi-FI Location-Based Services 4.1 Design Guide," May 20, 2008, 206 pages.

Cox, Jacob H. Jr., et al., "Advancing Software-Defined Networks: A Survey," IEEE, Oct. 12, 2017, pp. 25487-25526.

Cui, Wenzhi et al., "DiFS: Distributed Flow Scheduling for Data Center Networks," Nanjing University, China, Jul. 28, 2013, 10 pages.

Galvan T., Carlos E., et al., "Wifi bluetooth based combined positioning algorithm," International Meeting of Electrical Engineering Research ENIINVIE 2012, Procedia Engineering 35 (2012), pp. 101-108.

Geller, Michael, et al. , "5G Security Innovation with Cisco," Whitepaper Cisco Public, Jun. 8, 2018, pp. 1-29.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Ji, Philip N., et al., "Demonstration of High-Speed MIMO OFDM Flexible Bandwidth Data Center Network," Optical Society of America, 2012, 2 pages.

Kandula, Srikanth, et al., "Flyways to De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.

Leary, Jonathan, et al., "Wireless LAN Fundamentals: Mobility," Jan. 9, 2004, Cisco Press, 15 pages.

Network Heresy, "NVGRE, VXLAN and What Microsoft is Doing Right," Oct. 3, 2011, 5 pages.

Saraiva de Sousa, Nathan F., et al., "Network Service Orchestration: A Survey," IEEE Communications Surveys & Tutorials, Mar. 23, 2018, pp. 1-30.

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Ventre, Pier Luigi, et al., "Performance Evaluation and Tuning of Virtual Infrastructure Managers for (Micro) Virtual Network Functions," ieee.org, Nov. 7-10, 2016, pp. 1-7.

* cited by examiner

BITRATE UTILIZATION FEEDBACK AND CONTROL IN 5G-NSA NETWORKS

TECHNICAL FIELD

The present technology pertains to network resource utilization, and more specifically to controlling aggregate max bitrate (AMBR) and guaranteed bitrate (GBR).

BACKGROUND

Fifth-generation non-standalone (5G-NSA) mobile and wireless networks combine aspects of existing 4G network infrastructure with 5G network infrastructure. Such 5G-NSA networks generally consist of a combination of 4G evolved NodeB (eNB) cells and 5G next generation NodeB (gNB) cells, each with different capabilities and functionalities. However, there is currently little insight available to the core network regarding whether a User Equipment (UE) is currently connected to a 4G eNB or a 5G gNB.

BRIEF DESCRIPTION OF THE DRAWINGS

In order to describe the manner in which the above recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
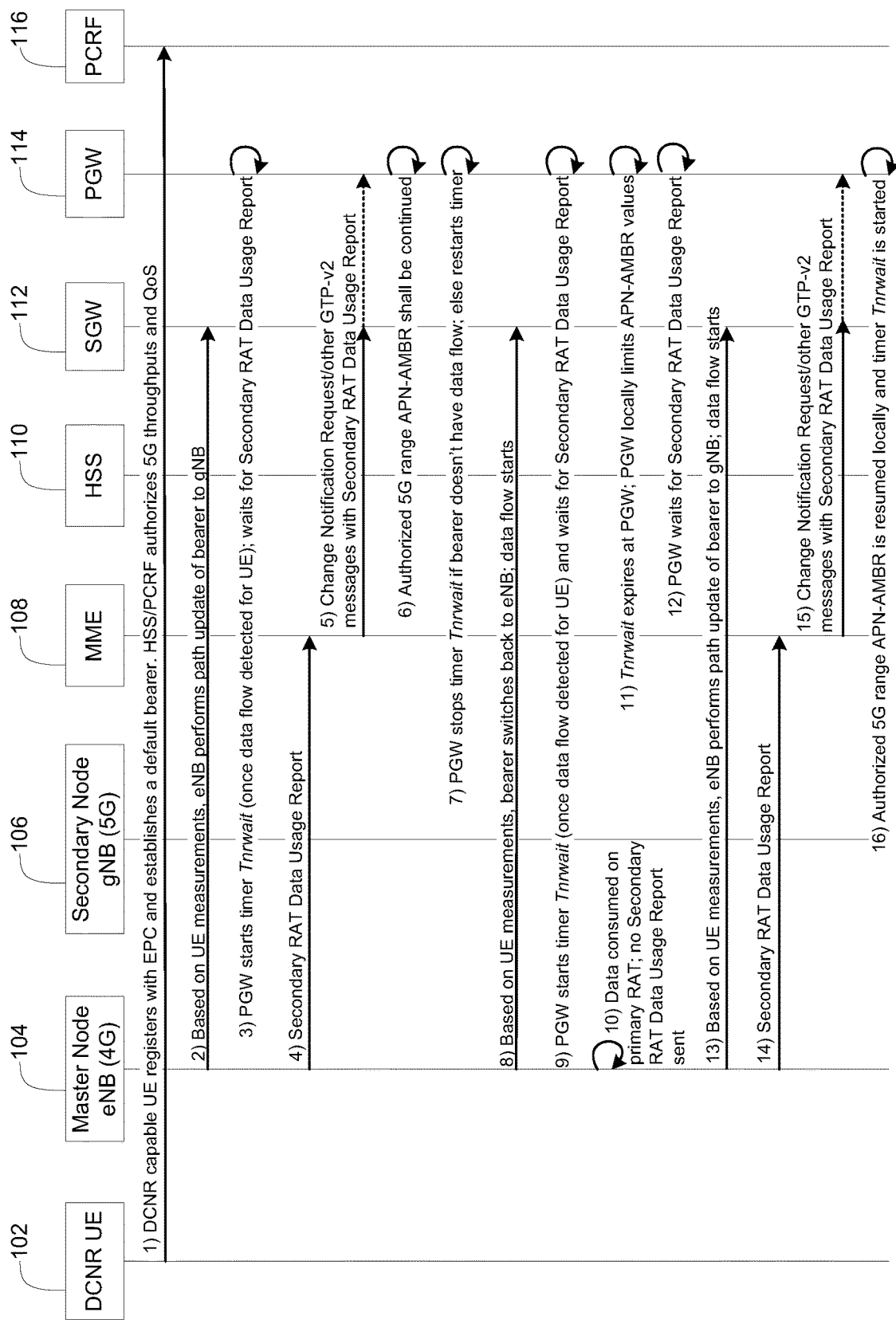
FIG. 1 illustrates an example 5G-NSA network environment and associated network flow for Aggregate Maximum Bitrate (AMBR) according to one or more aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting the scope of the embodiments described herein. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are systems, methods, and computer-readable storage media for optimally utilizing 5G-NSA network resources via an Aggregate Maximum Bitrate (AMBR) feedback mechanism. In some examples, a User Equipment (UE) is registered with a 5G-NSA network environment and a 5G AMBR is negotiated. A bearer-specific timer is triggered in response to detecting one or more data flows to the UE. Next, a Secondary Radio Access Technology (RAT) Data Usage Report is monitored for. In response to the bearer-specific timer expiring without a Secondary RAT Data Usage Report being received, it is determined that the UE is not currently being served by a 5G RAT. Subsequently, local rate limiting is performed to reduce the negotiated 5G AMBR to a limited AMBR having a lower bitrate than the negotiated 5G AMBR. The UE connection to the 5G-NSA network environment is then configured with the limited AMBR.

In another example, a dedicated 5G-range Guaranteed Bitrate (GBR) bearer creation request is received for a UE that currently resides in a 4G coverage area of a 4G evolved NodeB (4G eNB). It is determined not to perform a path update to a 5G next-generation NodeB (5G gNB), or it is determined that a path update to a 5G gNB cannot be performed. In response, a bearer-failure message is generated at the 4G eNB, where the bearer-failure message includes a 'Not served by NR' cause code. This bearer-failure message is transmitted to one or more of a Policy and Charging Rules Function (PCRF) and an Application Function (AF) associated with the UE, such that the bearer-failure message indicates to the PCRF and/or AF that the UE is not currently served by a 5G gNB and that a dedicated 5G GBR bearer should not be created for the UE, or that 5G GBR bearer creation should be deferred for some period of time.

Example Embodiments

In a 5G Non-Standalone (NSA) network architecture, a 5G throughput can be offered to User Equipment (UE) based on its user subscription, i.e. the UE has subscribed to 5G services so it is offered a 5G throughput. Such 5G throughputs might be in the range of 20 Gbps downlink and 10 Gbps uplink, where both the downlink and uplink bitrates are Aggregate Maximum Bitrates (AMBRs). These AMBRs are offered to the UE via a Home Subscriber Server (HSS) and/or Policy and Charging Rules Function (PCRF) of the 5G-NSA environment.

However, when performing this allocation, neither the HSS nor the PCRF is aware if a given UE is currently being served by a 4G eNB or a 5G gNB, because according to conventional networking techniques and architectures, the HSS and PCRF are both agnostic to the Radio Access Network (RAN). This is problematic when the UE is being served by a 4G eNB but is granted a 5G throughput which the 4G eNB is unable to provide due to inherent limitations in its network generation.

Per the LTE (Long Term Evolution) 4G architecture, rate limiting will be performed in the scenario in which the HSS/PCRF offers a 5G throughput to a UE that is only being served by a 4G eNB. In particular, download rate limiting is performed by a Packet Gateway (PGW) of the network and upload rate limiting is performed by the UE and/or by the PGW as well. However, because the overall 5G-NSA network has granted 5G throughputs to the UE, the PGW will continue to send downlink traffic at the 5G throughput rate and the traffic will continue to be throttled at the 4G eNB. This leads to unwanted consumption of backhaul resources across the entire 5G-NSA network, from the EPC to the Radio Access Network (RAN). This is particularly problematic with User Datagram Protocol (UDP) applications which are unable to dynamically adjust throughput.

Accordingly, the disclosed approaches can avoid configuring 5G throughputs on 4G eNB nodes, thereby more optimally utilizing the resources of a 5G-NSA network environment. An example method is described in detail with respect to FIG. 1, but broadly can be understood as leveraging secondary RAT (Radio Access Technology) Data Usage Reports that can be enabled within the 5G-NSA network environment, e.g., via a configuration file or license that is installed on the appropriate PGW.

FIG. 1 depicts a network architecture diagram of an example 5G-NSA network environment, the 5G-NSA environment of network components 102-116. Below these components of the 5G-NSA network environment are a series of data flows and communications according to aspects of the present disclosure. The network components include a User Equipment with Dual Connectivity with New Radio capabilities (DCNR UE) 102, meaning the DCNR is capable of wireless communication with one or more of a 4G eNB 104 and a 5G gNB 106. Also shown are a Mobility Management Entity (MME) 108, a Home Subscriber Server (HSS) 110, a Serving Gateway (SGW) 112, a Packet Gateway (PGW) 114, and a Policy and Charging Rules Function (PCRF) 116, although it is appreciated that a greater or lesser number of 5G-NSA network components can be provided according to a 5G-NSA network architecture as would be appreciated by one of ordinary skill in the art.

During session setup for DCNR UE 102, PGW 114 of the 5G-NSA network environment negotiates the APN-AMBR as is conventionally performed, e.g. per the requested Quality-of-Service (QoS) and the authorized QoS for DCNR UE 102. In the context of the present example where DCNR UE 102 is a 5G subscriber, the negotiated APN-AMBR throughputs will be 5G range throughputs. However, once the data flow starts for the session, the present disclosure provides for a bearer specific timer Tnrwait at PGW 114, which defines a temporal window in which PGW 114 will wait for a Secondary RAT Data Usage Report to be received to determine if the newly initiated data consumption of DCNR UE 102 is over a 5G gNB or not.

When a Secondary RAT Data Usage Report is received in a Change Notification Request message from MME 108) of the 5G-NSA network environment, the content of this Information Element (IE) will indicate the bearer ID and the secondary RAT (e.g., 5G, also known as 'New Radio') utilization for this bearer. In some embodiments, the Secondary RAT Data Usage Report can be piggybacked in any other GTP-v2 message as defined in 3GPP, rather than being received in the Change Notification Request message. Regardless of how it is received, from the Secondary RAT Data Usage Report, PGW 114 can determine that the bearer is being served by a 5G RAT, and therefore, PGW 114 will not perform any rate limiting of the data flow for DCNR UE 102 and this bearer. The authorized 5G APN-AMBR throughput will be continued and Tnrwait is reset such that the process may repeat.

When a Secondary RAT Data Usage Report is not received in any of the GTP-v2 messages from MME 108 of the 5G-NSA network environment within the interval defined by Tnrwait (i.e. Tnrwait expires without a Secondary RAT Data Usage Report being received), then PGW 114 determines that the data being consumed by DCNR UE 102 is not over a 5G RAT. In response to making this determination, PGW 114 will locally limit the APN-AMBR values for these bearers (i.e. served by a 4G RAT) to be no greater than the theoretical maximum bitrates for 4G. In some embodiments, these theoretical maximum 4G bitrates can be approximately 100 Mbps both upload and download. In some embodiments, rather than immediately performing local rate limiting to a theoretical 4G maximum bitrate, service providers can limit throughputs to one or more values of their choosing via a local configuration at PGW 114. Regardless of the precise value for the bitrate limiting, the method of the present disclosure advantageously allows for an optimal utilization of the network and backhaul resources of the 5G-NSA network environment.

For some time, data flow will continue with its bitrate limited to the 4G theoretical maximum or other pre-determined value specified at PGW 114. If PGW 114 receives a Secondary RAT Data Usage Report in a Change Notification Request or GRP-v2 message indicating that the bearer in question is now listed as a bearer served by 5G RAT, then PGW 114 will immediately remove the bitrate throttling, assign the authorized 5G-specific APN-AMBR throughputs to DCNR UE 102, and restart Tnrwait. Otherwise, data flow will continue to be bitrate limited until the data flow eventually ceases. After some idle time, data flow will resume, although PGW 114 will still have no insight as to whether the resumed data flow is on a 5G or 4G RAN. Hence, PGW 114 will start Tnrwait and apply 5G QoS and AMBR while waiting to see if a Secondary RAT Data Usage Report is received within the Tnrwait interval as described above.

Accordingly, the present disclosure configures PGW 114 to locally limit APN-AMBR values to some threshold below 5G bitrates until PGW 114 has successfully validated or learned that a given UE (such as DCNR UE 102) or bearer in question is currently served by 5G RAT.

As mentioned previously, beneath the network components 102-116, FIG. 1 presents a call-flow providing a more detailed characterization of the various events and interactions that take place between the constituent 5G-NSA network elements as DCNR UE 102 is served by 5G gNB 106 (steps 1-7), transitions to 4G eNB 104 (steps 8-11), and then returns to 5G gNB 106 (steps 12-16).

In step 1), DCNR UE 102 registers with the 5G-NSA EPC via master eNB 104, which only implements 4G technology, and establishes a default bearer. Based on a user subscription of DCNR UE 102, the Home Subscriber Server (HSS) 110 offers 5G throughputs and the Policy and Charging Rules Function (PCRF) 116 authorizes 5G QoS.

In step 2), eNB 104 obtains UE measurements and performs a path update of the associated bearer to gNB 106, thereby registering DCNR UE 102 with a 5G RAT instead of 4G RAT.

In step 3), data flow is detected for DCNR UE 102 from the new 5G gNB 106. In response, PGW 114 triggers Tnrwait, which comprises a pre-defined temporal interval, and then waits for a Secondary RAT Data Usage Report to be received. In some embodiments, Tnrwait can be optimally configured on PGW 114 according to the periodicity of the Secondary RAT Data Usage Report generation on the eNB 104. For example, if eNB 104 is configured to generate a Secondary RAT Data Usage Report every 90 seconds, then Tnrwait can be configured to be 90 seconds or greater.

In step 4), the master eNB 104 generates and transmits a Secondary RAT Data Usage Report, which contains the bearer ID, secondary RAT type, start and end time stamp, and usage information. In some embodiments, master eNB 104 can transmit the Secondary RAT Data Usage Report to MME 108 in octets. In some embodiments, MME 108 can forward the received Secondary RAT Data Usage Report to SGW 112 over an S11 interface (not shown).

In step 5), SGW 112 forwards the Secondary RAT Data Usage Report to PGW 114 over an S5 interface (not shown), as indicated by the dotted horizontal line.

In step 6), PGW 114 determines that DCNR UE 102 is currently being served by a 5G New Radio (i.e., 5G gNB 106) and allows the 5G-range APN-AMBR throughput to be continued. PGW 114 makes this determination based on having received the Secondary RAT Data Usage Report.

In step 7), PGW 114 stops Tnrwait if the bearer no longer has any data flows; otherwise, PGW 114 restarts Tnrwait.

In step 8), based on UE measurements, the bearer is switched back to 4G eNB 104, via what is known as a path update procedure. Once the path update procedure is complete, DCNR UE 102 resumes data flows.

In step 9), PGW 114 detects data flow for DCNR UE 102 and restarts Tnrwait. PGW 114 then waits to see if a Secondary RAT Data Usage Report will be received, as long as Tnrwait remains active.

In step 10), DCNR UE 102 consumes data on EUTRAN (4G), which is a primary RAT, and no Secondary RAT Data Usage Reports are generated or transmitted by eNB 104.

In step 11), Tnrwait expires at PGW 114, and in response, PGW 114 immediately begins to locally rate limit the APN-AMBR values to the 5G theoretical maximum bitrate values or to the APN-AMBR values configured previously within PGW 114. At this point in time, Tnrwait is not restarted—PGW 114 will simply continue to monitor in case a Secondary RAT Data Usage Report is received in the future.

In step 12), PGW 114 continues to monitor for a Secondary RAT Data Usage Report to be received.

In step 13), based on UE measurements, eNB 104 switches the bearer back to the 5G gNB 106 via a path update procedure. Once the path update procedure is complete, DCNR UE 102 resumes data flows.

In step 14), master eNB 104 generates and transmits Secondary RAT Data Usage Reports because the bearer is currently being served by 5G New Radio (NR) by way of 5G gNB 106. The Secondary RAT Data Usage Reports contain the bearer ID, secondary RAT type, start and end time stamps, and usage information. The Secondary RAT Data Usage Reports can be transmitted in octets to MME 108, which then forwards the Secondary RAT Data Usage Reports to SGW 112 over the S11 interface.

In step 15), SGW 112 forwards the Secondary RAT Data Usage Report to PGW 114 over the S5 interface. The Secondary RAT Data Usage Report can be forwarded as an Information Element (IE) in a Change Notification Request message or any other GTP-v2 message defined by 3GPP.

In step 16), PGW 114 determines that DCNR UE 102 is currently being served by a 5G New Radio (i.e, 5G gNB 106) and in response, PGW 114 will revert the rate limiting enforced in step 11). In other words, PGW 114 receives a Secondary RAT Data Usage Report and responds by allowing the authorized 5G range APN-AMBR to be continued for DCNR UE 102. Finally, PGW 114 restarts Tnrwait and will once again wait for a Secondary RAT Data Usage Report to be received. The process returns to step 1).

Accordingly, the present disclosure permits PGW 114 of the 5G-NSA network environment to dynamically learn the currently served RAT type for DCNR UE 102 and/or its related bearer(s), and to throttle the AMBR values if PGW 114 has determined that DCNR UE 102 is being served by a 4G eNB 104, or to revert to 5G throughputs if PGW 114 has determined that DCNR UE 102 is being served by a 5G gNB 106.

FIG. 1 was directed to Aggregate Maximum Bitrate (AMBR) and scenarios in which a UE might be associated with a 4G eNB or RAT that is unable to provide a 5G AMBR throughput. In a similar manner, FIG. 2 is directed to Guaranteed Bit Rate (GBR) and scenarios in which a UE might be associated with a 4G eNB or RAT that is unable to reserve sufficient resource blocks for a 5G GBR.

Figure 2:
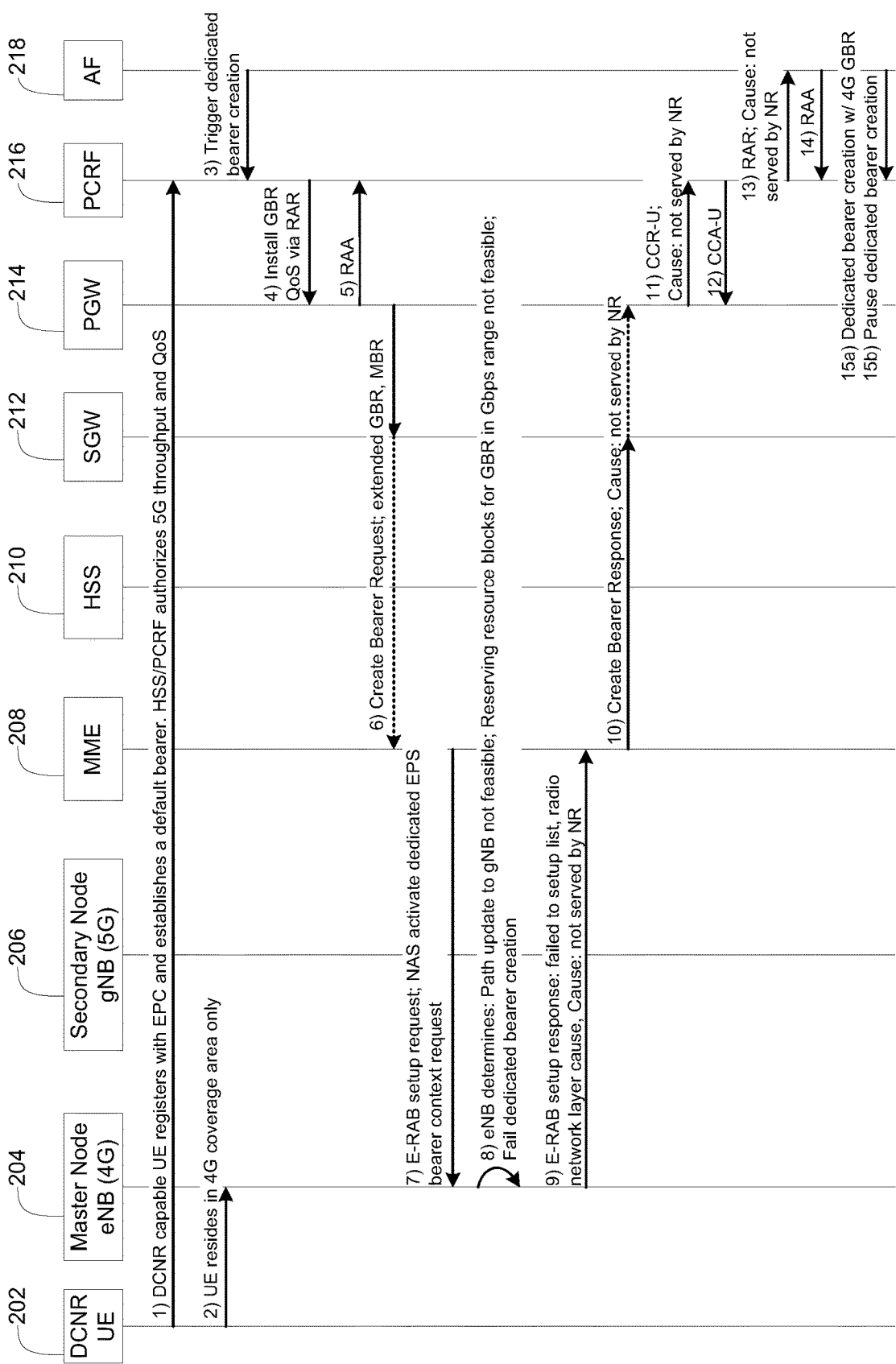
FIG. 2 illustrates an example 5G-NSA network environment and associated network flow for Guaranteed Bitrate (GBR) according to one or more aspects of the present disclosure.

In particular, FIG. 2 depicts a network architecture diagram of an example 5G-NSA network environment, the 5G-NSA environment of network components 202-218. In some embodiments, one or more of the network components 202-216 can be identical or substantially similar to the corresponding network component 102-116 depicted in FIG. 1 and discussed above. As illustrated, FIG. 2 includes a DCNR UE 202 which is capable of wireless communication with one or more of a 4G eNB 204 and a 5G gNB 206. Also shown are a Mobility Management Entity (MME) 208, a Home Subscriber Server (HSS) 210, a Serving Gateway (SGW) 212, a Packet Gateway (PGW) 214, a Policy and Charging Rules Function (PCRF) 216, and an Application Function (AF) 218, although it is appreciated that a greater or lesser number of 5G-NSA network components can be provided according to a 5G-NSA network architecture as would be appreciated by one of ordinary skill in the art.

In general, an application function such as AF 218 might trigger dedicated bearer creation with 5G GBR in the Gbps range in scenarios in which heavy bandwidth may be required (e.g., virtual reality (VR) and augmented reality (AR) applications) by DCNR UE 202. However, none of AF 218, PCRF 216, and PGW 214 in the 5G-NSA network environment are aware of DCNR UE 202's currently served RAT type, causing the network to default to creating dedicated bearers with higher GBR, as stipulated by DCNR UE 202's 5G subscription. The attempt to create these bearers will fail when DCNR UE 202 is in the vicinity of a 4G eNB such as 4G eNB 204 as these nodes simply are unable to reserve resource blocks in the Gbps range as is needed to supply 5G GBR.

Applications which require this higher 5G GBR will not be able to function until the requisite GBR bearers are established. Accordingly, conventional approaches cause the application to make another, substantially immediate attempt to trigger the dedicated 5G bearer creation once again. It would be desirable to provide a mechanism by which an application server or AF 218 is informed of the cause of a dedicated 5G GBR bearer creation failure and subsequently able to re-attempt with a downgraded GBR when the cause of failure is indicated as non-availability of a 5G New Radio (NR) technology, for example a non-availability of one or more of 5G gNB 206 or a 5G RAT.

As detailed in the network flows of FIG. 2, the present disclosure provides a feedback mechanism spanning from the Radio Access Network of 4G eNB 204 to PCRF 216 and AF 218 in order to thereby provide a suitable notification when 5G GBR bearer establishment fails at a 4G eNB such as 4G eNB 206. Broadly, this feedback mechanism is established by introducing a new cause code "not served by NR" into the existing Radio Network Layer cause code category in S1AP (S1 Application Protocol). This new cause code is propagated in the GTP-v2 (GPRS Tunneling Protocol v2) interface via one or more existing IE (Information Element) RAN/NAS causes, and is propagated in the Gx interface via existing IE RAN-NAS-Release causes. Advantageously, no new standalone messages are introduced, meaning that there is no additional signaling overhead required, or any new IEs.

In step 1), DCNR UE 202 registers with the Evolved Packet Core (EPC) of the 5G-NSA network architecture. More particularly, during this registration process, one or more default bearers are established and HSS 210 and/or PCRF 216 authorizes 5G QoS (APN-AMBR) based on a user subscription of DCNR UE 202.

In step 2), DCNR UE 202 resides in a 4G coverage area only.

In step 3), DCNR UE 202 invokes a VR gaming application, or some other application that has high bandwidth requirements. By default, AF 218 recognizes that such an application needs GBR bearers and, as DCNR UE 202 is subscribed to 5G services, AF 218 triggers dedicated bearer creation with GBR in the 5G range (Gbps).

In step 4), PCRF 216 installs a rule with extended GBR QoS values into PGW 214 via a Re-Auth-Request (RAR).

In step 5), PGW 214 acknowledges the RAR with a Re-Auth-Answer (RAA).

In step 6), PGW 214 and SGW 212 combine to send a Create Bearer Request with extended GBR and MBR values to MME 208.

In step 7), MME 208 sends an EUTRAN Radio Access Bearer (E-RAB) setup request to the master 4G eNB 204. The E-RAB setup request contains extended E-RAB GBR and MBR, along with an activate default Evolved Packet System (EPS) bearer context request.

In step 8), the eNB 204 determines that DCNR UE 202 is not in the vicinity (e.g., a threshold proximity) of a 5G gNB cell such as 5G gNB 206, and further determines that a path update to a 5G gNB is not feasible given that DCNR UE 202 is not in the vicinity of a 5G gNB cell. The 4G eNB 204 therefore decides that reserving resource blocks for GBR in the 5G Gbps range is not feasible, and consequently, 4G eNB 204 ultimately decides to fail the dedicated bearer creation.

In step 9), 4G eNB 204 sends an E-RAB setup response with an E-RAB failed to setup list, which contains a new cause code "Not served by NR" in the Radio Network Layer cause category, according to an aspect of the present disclosure.

In step 10), MME 208/SGW 212 sends to PGW 214 a Create Bearer Response with a RAN/NAS cause: Protocol Type: S1AP cause; Cause Type: Radio Network Layer; Proposed New Cause (as contemplated by the present disclosure): "Not served by NR".

In step 11), PGW 214 sends to PCRF 216 a Credit Control Request-Update (CCR-U) with a charging-rule-report, RAN-NAS-Release-Cause: Protocol Type: S1AP cause; Cause Type: Radio Network Layer; Proposed new cause: "Not served by NR".

In step 12), PCRF 216 acknowledges with a Credit Control Answer-Updated (CCA-U).

In step 13), PCRF 216 sends a RAR (Re-Auth-Request) to AF 218 with RAN-NAS-Release-Cause: Protocol Type: S1AP cause; Cause Type: Radio Network Layer; Proposed new cause: "Not served by NR".

In step 14), AF 218 acknowledges with an RAA.

In step 15), via the feedback mechanism of the present disclosure, AF 218 has obtained knowledge of bearer creation failure as being due to "Not served by NR". At this stage, AF 218 chooses between a decision 15*a*) to trigger dedicated bearer creation with GBR bitrates in the 4G/EUTRAN range (and notify DCNR UE 202 of the absence of a 5G cell explicitly, rather than implicitly by transmitting 4G GBR to DCNR UE 202 with no explanation), and a decision 15*b*) to hold on triggering dedicated bearer creation for some guard time in hopes that a 5G cell will be available at the expiration of the guard time.

The feedback mechanism of the present disclosure, as described above with respect to FIG. 2, allows AF 218 to learn that DCNR UE 202 is not currently served by a 5G New Radio (NR) technology, for example 5G gNB cell such as 5G gNB 206 or a 5G RAT. Based on the nature of the application, AF 218 can elect to establish dedicated bearers with a downgraded GBR in the 4G range, i.e. if AF 218 determines that instead of failing the application launch due to lack of 5G GBR, it can launch the application with 4G range GBR without significantly compromising end user experience. In some embodiments, AF 218 can also send a notification to DCNR UE 202 such that DCNR UE 202 is made directly aware of the failure due to unavailability of NR and/or AF 218 can notify a user of DCNR UE 202 of the absence of a 5G cell. In this manner, DCNR UE 202 would always be aware of the network connectivity and RAT availability, and it would not need to first receive a 4G throughput in order to realize that there is no 5G connectivity available. In some embodiments, AF 218 can elect to put in place a temporary hold on creating the dedicated bearers with 5G range GBR, for example by activating a guard timer of some pre-determined temporal interval in order to thereby avoid back-to-back signaling consumption on the network—when AF 218 has the knowledge that DCNR UE 202 is not currently served by a 5G cell such as 5G gNB 206, it is non-optimal and unnecessary to continuously attempt to establish GBR bearers in the 5G range because they will simply continue to fail. AF 218 can instead hold and retry after some time elapses where DCNR UE 202 may have moved in range of a 5G cell such as 5G gNB 206.

Figure 3:
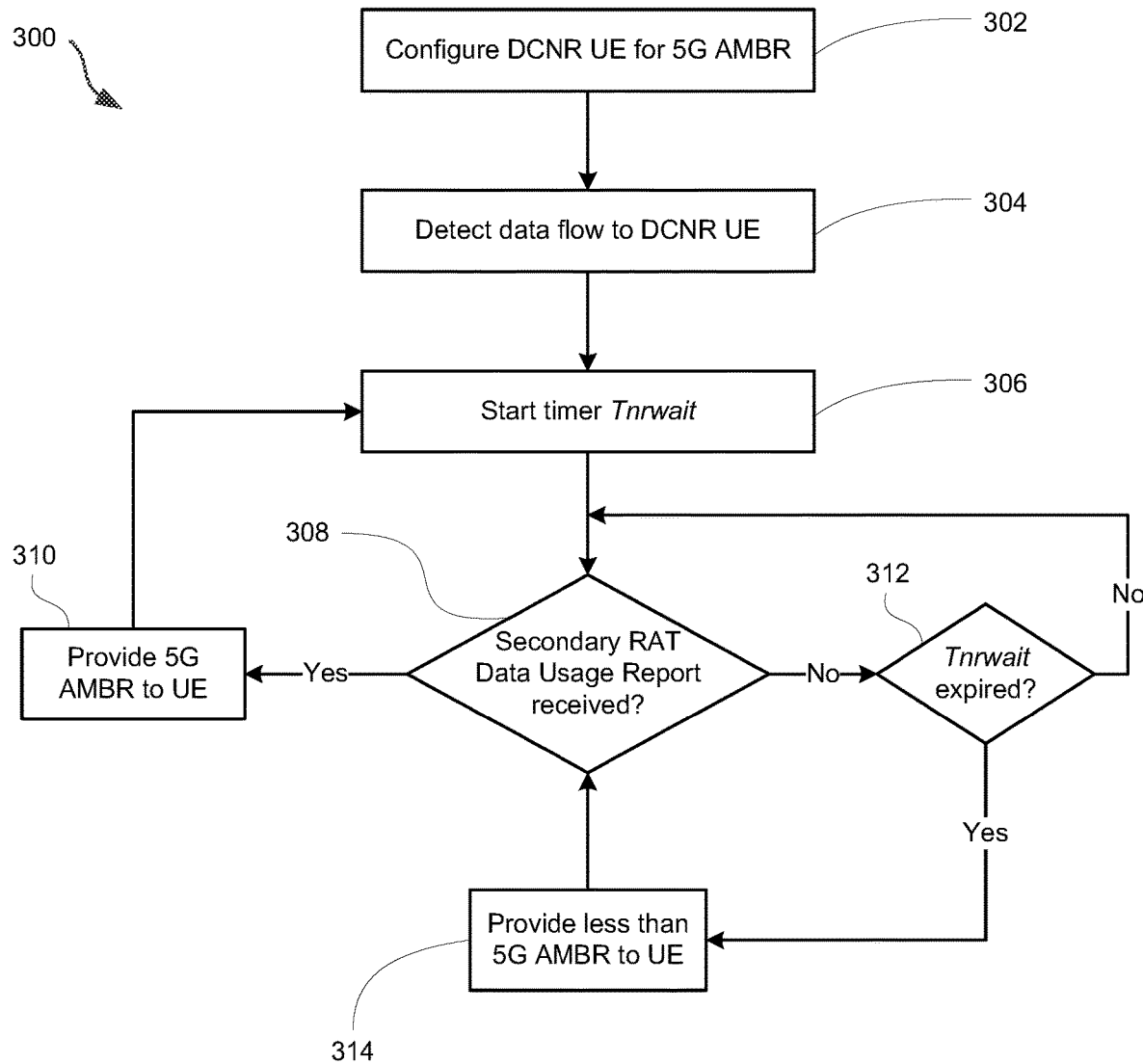
FIG. 3 illustrates an example method according to one or more aspects of the present disclosure.

FIG. 3 illustrates an example method 300 according to aspects of the present disclosure. In particular, the method 300 corresponds in some embodiments to the network architecture and call flow portrayed in FIG. 1.

In a first step 302, a DCNR UE or DCNR-compatible UE registers with a network, such as a 5G NSA architecture network, and is assigned a 5G-range AMBR, for example in the Gbps range. In some embodiments, the assignment of the 5G-range AMBR can be based on a user subscription associated with the particular UE.

In step 304, data flow is detected to the DCNR UE. Because the 5G NSA network can provide both 5G and 4G connections (e.g. by way of 4G eNBs and 5G gNBs), it is necessary to quantify the type of connection being provided or served to the DCNR UE.

In order to do so, a timer Tnrwait is started in step 306, and can specify a pre-defined or dynamic interval depending upon one or more parameters and/or configurations of the 5G NSA network, as described above with respect to FIG. 1.

Once timer Tnrwait has been triggered, the method proceeds to a step 308, which checks if a Secondary RAT Data Usage Report has been received. In some embodiments, a Secondary RAT Data Usage Report may be received from a master node eNB of the 5G NSA network, at one or more of an MME, a SGW, and a PGW of the 5G NSA network. For example, the Secondary RAT Data Usage Report can be transmitted as a Change Notification Request or other GTP-v2 messages already existing within the context of the 5G NSA call flow, as would be appreciated by one of ordinary skill in the art.

If a Secondary RAT Data Usage Report is received, then the method proceeds to a step 310 which provides a 5G AMBR to the DCNR UE. If the DCNR UE was already configured with a 5G AMBR, then no action needs to be taken. Step 310 then returns to step 306, where the timer Tnrwait is restarted and another Secondary RAT Report is monitored for.

If in step 308, a Secondary RAT Data Usage Report is not received, then the method proceeds instead to another decision point 312, which checks if Tnrwait has expired. If Tnrwait has not expired, then the method returns to 308 and continues to look for a Secondary RAT Data Usage Report until it is either received (in step 310), or the timer Tnrwait expires.

When timer Tnrwait expires, the method proceeds to a step 314, which performs local limiting or throttling for DCNR UE and/or one or more bearers associated with DCNR UE, such that DCNR UE is provided with a throughput or AMBR that is less than a 5G AMBR. In some embodiments, this can be approximately equal to the theoretical maximum 4G AMBR, or can be equal to some other AMBR limit configured within the 5G NSA network, e.g. at the PGW. After the local rate limiting has been applied, the method returns to step 308 and monitors for a Secondary RAT Data Usage Report to be received. Tnrwait is not necessarily restarted at this time, although it can be restarted if so desired.

Figure 4:
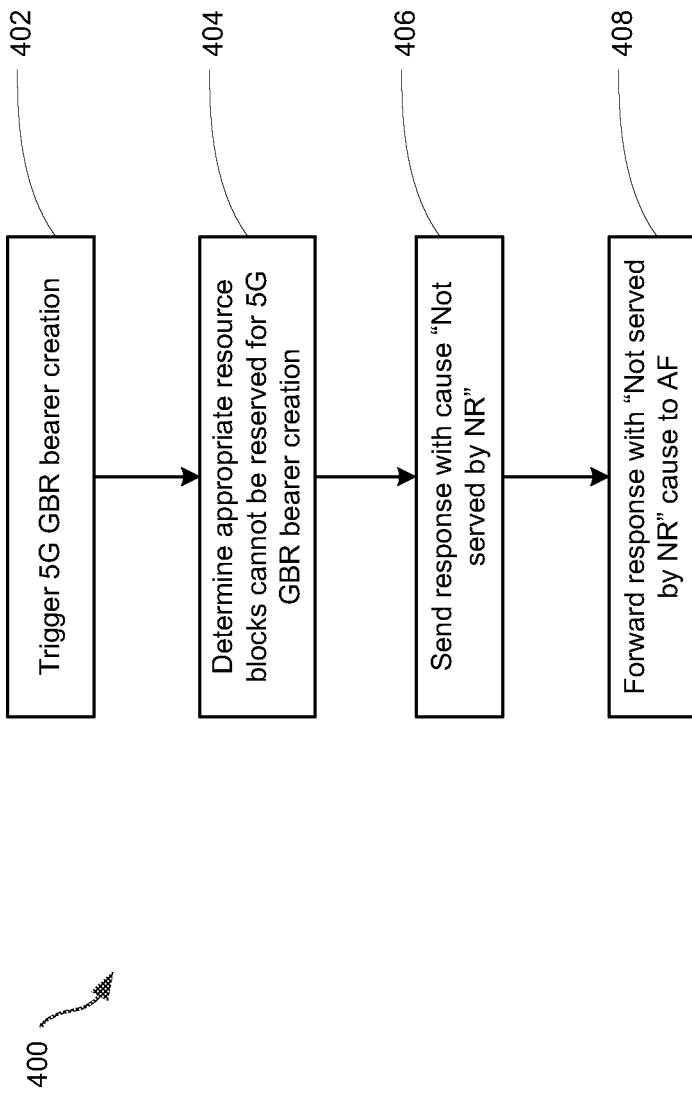
FIG. 4 illustrates an example method according to one or more aspects of the present disclosure.

FIG. 4 illustrates an example method 400 according to aspects of the particular disclosure. In particular, the method 400 corresponds in some embodiments to the network architecture and call flow portrayed in FIG. 2.

In a first step 402, dedicated GBR bearer creation in the 5G (e.g., Gbps) range is triggered. This can be in response to a UE invoking an application that needs GBR bearers, and a determination being made that the UE is associated with a user subscription that includes 5G services—accordingly, the request is for 5G GBR bearers. In some embodiments, the UE can invoke an application that requires 5G GBR bearers, e.g. a VR gaming application with high data consumption, in which case the request is also for 5G GBR bearers.

In a step 404, it is determined that appropriate resource blocks cannot be reserved for 5G GBR bearer creation that will satisfy the request triggered or otherwise received in step 402. This can occur when the UE resides in a 4G coverage area, therefore meaning that 5G coverage (e.g., provided via one or more 5G gNBs) is unavailable, in which case the bearer creation will be failed. The UE might determine that a path update to a 5G gNB is not possible as an additional criteria evaluated before failing the bearer creation request. In some embodiments, the 4G master node eNB can make this determination and triggering the processing of failing the dedicated bearer creation request.

In a step 406, a response is sent with an indication of the dedicated bearer creation request failure, where the response includes a new cause "Not served by NR". In some embodiments, the 4G master node eNB transmits an E-RAB setup response with an E-RAB failed to setup list including the "Not served by NR" cause. In some embodiments, the 4G master node eNB transmits this response to an MME of the 5G network.

In a step 408, the response including the "Not served by NR" cause is forwarded to the Application Function (AF) that triggered or requested the 5G GBR bearer creation in step 402. In some embodiments, this response is forwarded from the MME to one or more of an SGW, a PGW, and a PCRF of the 5G-NSA network before ultimately reaching the AF. In this manner, knowledge of the dedicated bearer creation request failing due to the UE not being served by NR is propagated throughout the 5G-NSA network and its constituent components.

Figure 5:
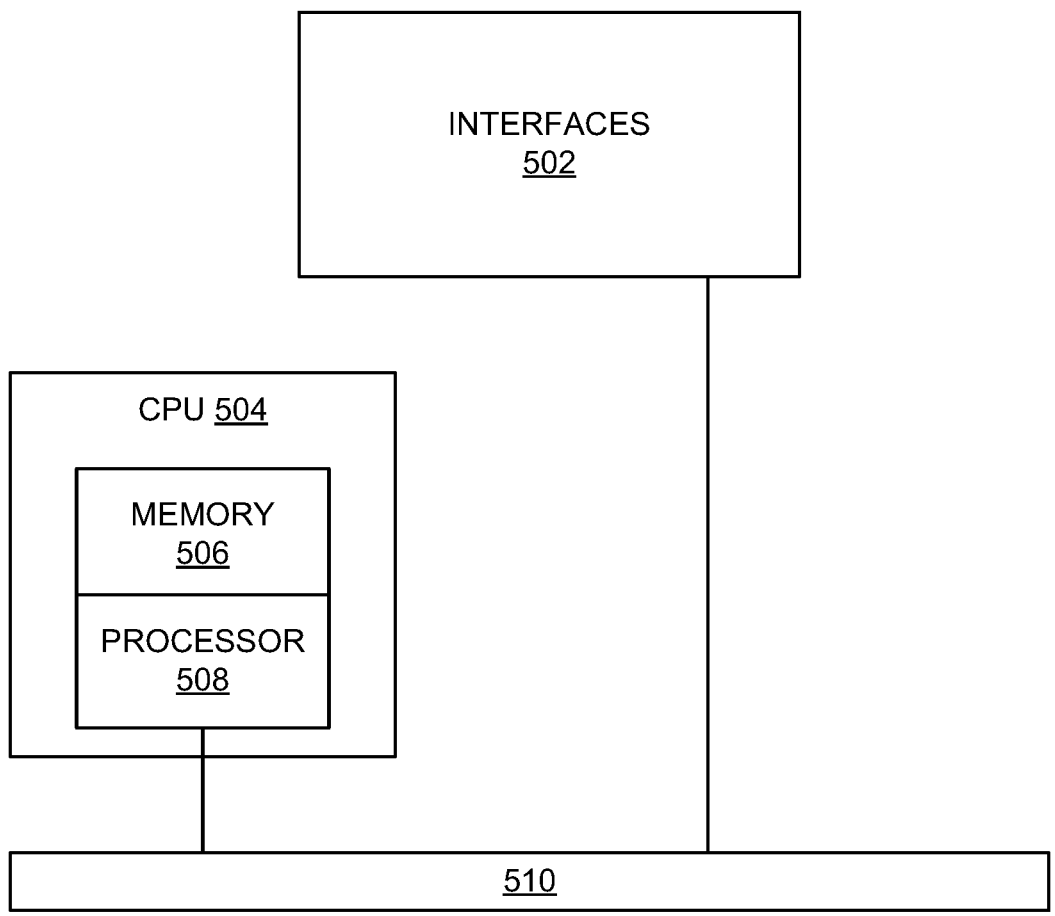
FIG. 5 illustrates an example network device upon which one or more aspects of the present disclosure may be provided.

FIG. 5 depicts an example network device upon which one or more aspects of the present disclosure can be implemented. Although the system shown in FIG. 5 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing, switching, and/or other operations. The ASIC can communicate with other components in the network device 500 via the connection 510, to exchange data and signals and coordinate various types of operations by the network device 500, such as routing, switching, and/or data storage operations, for example.

Figure 6:
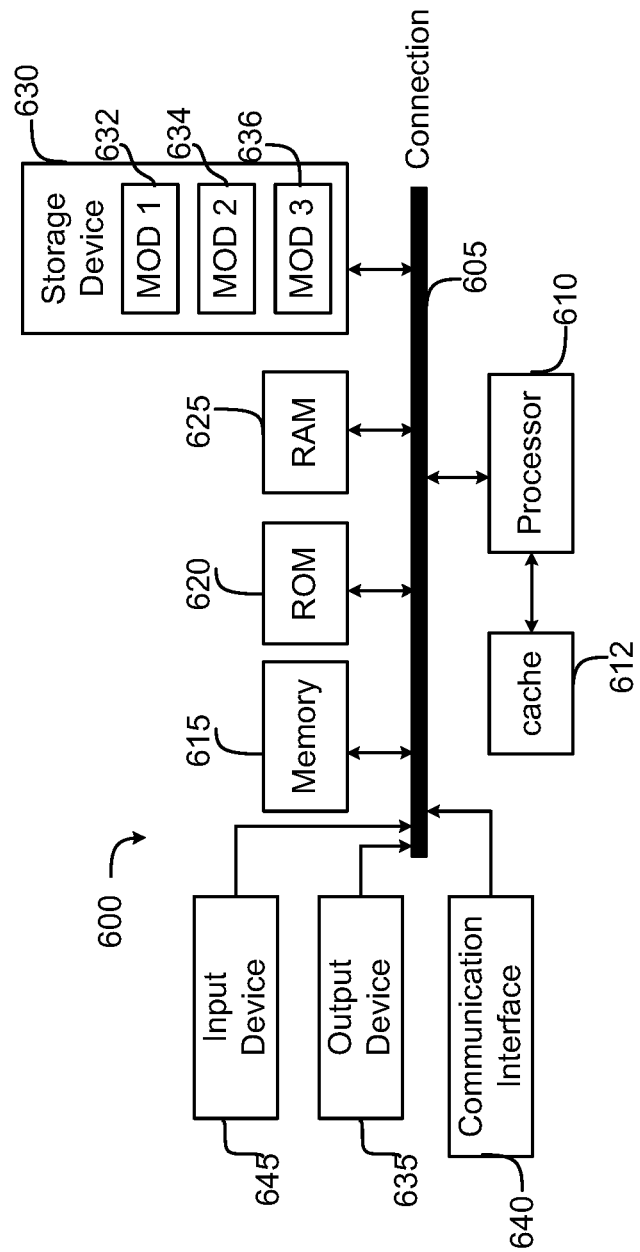
FIG. 6 illustrates an example computing system architecture upon which one or more aspects of the present disclosure may be provided.

FIG. 6 illustrates an example computing system architecture 600 including components in electrical communication with each other using a connection 605, such as a bus, upon which one or more aspects of the present disclosure can be implemented. System 600 includes a processing unit (CPU or processor) 610 and a system connection 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
registering a User Equipment (UE) with a 5G-NSA (Non-Standalone) network environment by negotiating a 5G Aggregate Maximum Bitrate (AMBR);
triggering a bearer-specific timer in response to detecting a data flow to the UE;
monitoring for the receipt of a Secondary Radio Access Technology (RAT) Data Usage Report; and
in response to the bearer-specific timer expiring without a Secondary RAT Data Usage Report being received:
  determining that the UE is not currently being served by a 5G RAT;
  performing local rate limiting by reducing the negotiated 5G AMBR to a limited AMBR having a lower bitrate than the negotiated 5G AMBR; and
  configuring the UE connection to the 5G-NSA network environment with the limited AMBR.

2. The method of claim 1, further comprising:
maintaining the local rate limiting and the limited AMBR;
determining, at a later time, that a Secondary RAT Data Usage Report has been received;
removing the local rate limiting by configuring the UE connection to the 5G-NSA network environment with the negotiated 5G AMBR; and
retriggering the bearer-specific timer.

3. The method of claim 1, further comprising, in response to receiving a Secondary RAT Data Usage Report without the bearer-specific timer expiring:
determining that the UE is currently being served by a 5G RAT;
maintaining the UE connection to the 5G-NSA network environment with the negotiated 5G AMBR;
retriggering the bearer-specific timer; and
continuously monitoring for the receipt of an additional Secondary RAT Data Usage Report.

4. The method of claim 1, wherein the Secondary RAT Data Usage Report is generated by a 4G extended NodeB (eNB) of the 5G-NSA network environment.

5. The method of claim 4, where the bearer-specific timer is configured with an interval that is substantially equal to a periodicity with which the 4G eNB generates Secondary RAT Data Usage Reports.

6. The method of claim 1, wherein the Secondary RAT Data Usage Report is received via one or more of:
a Change Notification Request message; and
a GTP-v2 (GPRS Tunneling Protocol version 2) message.

7. The method of claim 1, wherein the local rate limiting is performed at a Packet Gateway (PGW) of the 5G-NSA network environment.

8. A computer-readable device having stored therein instructions which, when executed by at least one processor, cause the at least one processor to perform operations comprising:
registering a User Equipment (UE) with a 5G-NSA (Non-Standalone) network environment by negotiating a 5G Aggregate Maximum Bitrate (AMBR);
triggering a bearer-specific timer in response to detecting a data flow to the UE;
monitoring for the receipt of a Secondary Radio Access Technology (RAT) Data Usage Report; and
in response to the bearer-specific timer expiring without a Secondary RAT Data Usage Report being received:
  determining that the UE is not currently being served by a 5G RAT;
  performing local rate limiting by reducing the negotiated 5G AMBR to a limited AMBR having a lower bitrate than the negotiated 5G AMBR; and
  configuring the UE connection to the 5G-NSA network environment with the limited AMBR.

9. The computer-readable device of claim 8, where the instructions further cause the at least one processor to perform operations comprising:
maintaining the local rate limiting and the limited AMBR;
determining, at a later time, that a Secondary RAT Data Usage Report has been received;
removing the local rate limiting by configuring the UE connection to the 5G-NSA network environment with the negotiated 5G AMBR; and
retriggering the bearer-specific timer.

10. The computer-readable device of claim 8, where in response to receiving a Secondary RAT Data Usage Report with the bearer-specific timer expiring, the instructions further cause the at least one processor to perform operations comprising:
determining that the UE is currently being served by a 5G RAT;
maintaining the UE connection to the 5G-NSA network environment with the negotiated 5G AMBR;
retriggering the bearer-specific timer; and
continuously monitoring for the receipt of an additional Secondary RAT Data Usage Report.

11. The computer-readable device of claim 8, where the instructions further cause the at least one processor to cause a 4G extended NodeB (eNB) of the 5G-NSA network environment to generate the Secondary RAT Data Usage Report.

12. The computer-readable device of claim 11, where the instructions further cause the at least one processor to configure the bearer-specific timer with an interval that is substantially equal to a periodicity with which the 4G eNB generates Secondary RAT Data Usage Reports.

13. The computer-readable device of claim 8, where the instructions further cause the at least one processor to receive the Secondary RAT Data Usage Report via one or more of:
a Change Notification Request message; and
a GTP-v2 (GPRS Tunneling Protocol version 2) message.

14. The computer-readable device of claim 8, where the instructions further cause the at least one processor to perform the local rate limiting at a Packet Gateway (PGW) of the 5G-NSA network environment.

15. The computer-readable device of claim 8, where the instructions further cause the at least one processor to perform the local rate limiting such that the limited AMBR is equal to one or more of a maximum 4G AMBR and a pre-defined AMBR value configured in a memory of a Packet Gateway (PGW) of the 5G-NSA network environment.

16. A system comprising:
one or more processors; and
memory including instructions that, upon being executed by the one or more processors, cause the system to:
  register a User Equipment (UE) with a 5G-NSA (Non-Standalone) network environment by negotiating a 5G Aggregate Maximum Bitrate (AMBR);
  trigger a bearer-specific timer in response to detecting a data flow to the UE;
  monitor for the receipt of a Secondary Radio Access Technology (RAT) Data Usage Report; and
  in response to the bearer-specific timer expiring without a Secondary RAT Data Usage Report being received:

determine that the UE is not currently being served by a 5G RAT;

perform local rate limiting by reducing the negotiated 5G AMBR to a limited AMBR having a lower bitrate than the negotiated 5G AMBR; and configure the UE connection to the 5G-NSA network environment with the limited AMBR.

17. The system of claim 16, wherein the instructions further cause the system to:

maintain the local rate limiting and the limited AMBR;

determine, at a later time, that a Secondary RAT Data Usage Report has been received;

remove the local rate limiting by configuring the UE connection to the 5G-NSA network environment with the negotiated 5G AMBR; and retrigger the bearer-specific timer.

18. The system of claim 16, wherein the instructions further cause the system to, in response to receiving a Secondary RAT Data Usage Report without the bearer-specific timer expiring:

determine that the UE is currently being served by a 5G RAT;

maintain the UE connection to the 5G-NSA network environment with the negotiated 5G AMBR;

retrigger the bearer-specific timer; and continuously monitor for the receipt of an additional Secondary RAT Data Usage Report.

19. The system of claim 16, wherein the Secondary RAT Data Usage Report is generated by a 4G extended NodeB (eNB) of the 5G-NSA network environment.

20. The system of claim 19, where the bearer-specific timer is configured with an interval that is substantially equal to a periodicity with which the 4G eNB generates Secondary RAT Data Usage Reports.

* * * * *